US009410028B2

(12) United States Patent
Prenzel et al.

(10) Patent No.: US 9,410,028 B2
(45) Date of Patent: Aug. 9, 2016

(54) PROCESS FOR PREPARING POLYACRYLATES

(71) Applicant: tesa SE, Hamburg (DE)

(72) Inventors: Alexander Prenzel, Hamburg (DE); Jennifer Beschmann, Hamburg (DE)

(73) Assignee: tesa SE, Norderstedt (DE)

( * ) Notice: Subject to any disclaimer, the term of this patent is extended or adjusted under 35 U.S.C. 154(b) by 39 days.

(21) Appl. No.: 13/717,939

(22) Filed: Dec. 18, 2012

(65) Prior Publication Data

US 2013/0123405 A1 May 16, 2013

Related U.S. Application Data

(62) Division of application No. 12/844,055, filed on Jul. 27, 2010, now abandoned.

(30) Foreign Application Priority Data

Aug. 12, 2009 (DE) .................. 10 2009 036 967

(51) Int. Cl.
C09D 133/08 (2006.01)
C09D 133/10 (2006.01)
C08K 5/36 (2006.01)
C08F 2/38 (2006.01)
C08F 20/18 (2006.01)

(52) U.S. Cl.
CPC ... C08K 5/36 (2013.01); C08F 2/38 (2013.01); C08F 20/18 (2013.01)

(58) Field of Classification Search
CPC .............. C08K 5/36; C08K 5/37; C08K 5/38; C08F 2/38; C08F 20/18
USPC ............................ 526/89, 220, 224, 236, 234
See application file for complete search history.

(56) References Cited

U.S. PATENT DOCUMENTS

| | | | |
|---|---|---|---|
| 4,925,905 A | 5/1990 | Boeckh et al. | |
| 5,073,611 A | 12/1991 | Rehmer et al. | |
| 5,298,585 A * | 3/1994 | McCallum et al. | 526/317.1 |
| 5,380,790 A | 1/1995 | Chen et al. | |
| 5,412,051 A | 5/1995 | McCallum, III et al. | |
| 5,489,642 A | 2/1996 | Gleichenhagen et al. | |
| 6,280,713 B1 * | 8/2001 | Tranchant | A61K 8/042 424/401 |
| 6,458,230 B1 | 10/2002 | Rupaner et al. | |
| 6,632,907 B1 * | 10/2003 | Mizota et al. | 526/319 |
| 7,034,085 B2 | 4/2006 | Mestach et al. | |
| 2004/0049972 A1 | 3/2004 | Husemann et al. | |
| 2004/0167285 A1 * | 8/2004 | Brennan et al. | 525/178 |
| 2007/0299226 A1 | 12/2007 | Park et al. | |
| 2009/0283209 A1 | 11/2009 | Husemann et al. | |

FOREIGN PATENT DOCUMENTS

| | | |
|---|---|---|
| DE | 38 12 402 A1 | 10/1989 |
| DE | 43 40 297 A1 | 6/1996 |
| DE | 694 23 669 T2 | 11/2000 |
| DE | 10 2005 024 246 A1 | 11/2006 |
| EP | 0 621 326 B1 | 10/1994 |
| EP | 1 215 324 A2 | 6/2002 |
| EP | 1 311 554 B1 | 11/2004 |
| WO | 99/20669 A1 | 4/1999 |
| WO | WO 9920669 A1 * | 4/1999 .............. C08F 22/10 |

OTHER PUBLICATIONS

DIN 53765:Mar. 1994. Marc Husemann, "Method for Stamping Thermally Activatable Adhesive Materials Which Are Not Tacky At Room Temperature".
Donatas Satas, "Handbook of Pressure Sensitive Adhesive Technology", van Nostrand, (1989).
T.G. Fox, "Influence of Diluent and of Copolymer Composition on the Glass Temperature of a Polymer System", Bull. Am. Phys. Soc. No. 1, p. 123, (1956).
H. G. Elias, "Makromoleküle", Hüthig & Wepf Verlag Basel, 5th edition, (1990).
Houben Weyl, "Methoden der Organischen Chemie", vol. E, No. 19a, pp. 60-147.
Fikentscher, Communication vol. 8, pp. 381-385, (Polymer 1967).
Römpp online 2009, document code RD-18-00666; Edited by: Oliver Brüggemann, Copyright © 2010 Georg Thieme Verlag.
Chujo et al., "Synthesis of Aromatic Dicarboxyl-Terminated Poly(methyl Methacrylate) Macromonomers", Journal of Polymer Science: Part A: Polymer Chemistry, vol. 27, pp. 2007-2014, 1989.

* cited by examiner

Primary Examiner — Karuna P Reddy
(74) Attorney, Agent, or Firm — Norris McLaughlin & Marcus PA

(57) ABSTRACT

Process for preparing polyacrylates, by the free-radical polymerization of monomer mixtures comprising at least 70% by weight of at least one acrylic and/or methacrylic ester in the presence of amino acids as regulator substances, and reaction solution comprising one or more solvents and one or more monomers, at least 50% by weight of the solvents being organic solvents, and at least 70% by weight of the monomers being acrylic and/or methacrylic esters, with at least one amino acid being present.

9 Claims, 1 Drawing Sheet

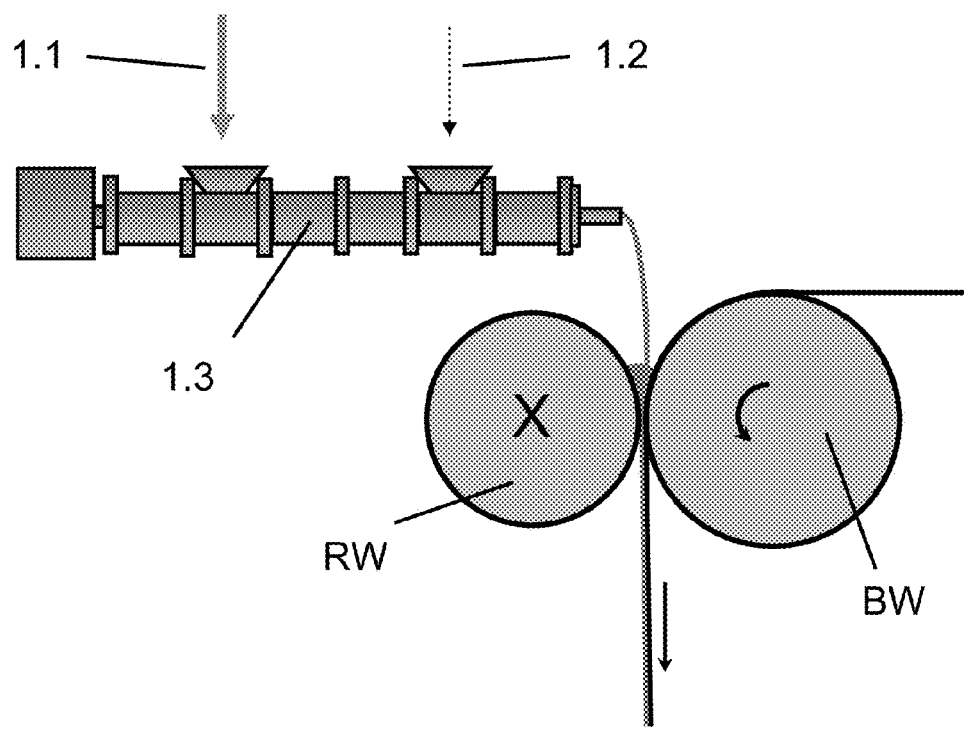

PROCESS FOR PREPARING POLYACRYLATES

This is a Division of application Ser. No. 12/844,055, now pending, which claims priority to German Application No. 10 2009 036 967.8, filed Aug. 12, 2009.

The invention relates to a process for preparing polyacrylates by means of free radical polymerization, using natural or non-natural amino acids containing thiol and/or hydroxyl groups as non-toxic and non-volatile chain-transfer regulators for regulating the molar masses and molar mass distribution, allowing the solvent used in the polymerization, following its removal, to be reused for further polymerizations in the case of a drying operation or in the case of the preparation of a polyacrylate hotmelt, without a change in the molar masses and molar mass distribution of the polyacrylates as the number of recycling steps goes up.

BACKGROUND OF THE INVENTION

Owing to ongoing technological developments in the coating process, there is a continuing demand for new developments in the field of pressure sensitive adhesives (PSAs). In industry, hotmelt processes with solvent-free coating technology for preparing PSAs are of growing significance, since the environmental strictures are becoming ever greater and the prices of solvents are also rising. Hotmelt processes are already state of the art for SIS adhesives. In contrast, acrylate PSAs are still processed largely from solution. In this respect, an excessive average molecular weight continues to present problems, since, although it is essential for high shear strength, it causes a sharp rise in the flow viscosity, and so acrylate hotmelts with an average molecular weight of >1 000 000 g/mol are difficult to process from the melt.

On the other hand, low molecular weight acrylate hotmelts have already been successfully implemented as hotmelt PSAs (BASF AG, e.g. UV 203 AC Resins). Here, benzophenone derivatives or acetophenone derivatives are incorporated as an acrylated photoinitiator into the acrylate polymer chain and are then crosslinked with UV radiation [U.S. Pat. No. 5,073,611]. Nevertheless, the achievable shear strength for systems of this kind is still not satisfactory, although, as a result of the low average molecular weight (≈250 000 g/mol), the flow viscosity is relatively low.

The preparation of relatively high molecular weight acrylate PSAs (average molecular weight between 250 000 g/mol and 1 000 000 g/mol) necessitates specific polymerization processes. Polymerization cannot be carried out without solvent, since at a certain point in time the flow viscosity becomes too high and the conversion of the reaction is very low. The residual monomers remaining would disrupt the hotmelt operation. Consequently, acrylate monomers are polymerized conventionally in solution and then concentrated in a concentrating extruder [EP 0621 326 B1].

Nevertheless, the concentration of this acrylate PSA causes problems, since environmental considerations frequently dictate the use of solvent mixtures, such as special-boiling-point spirit and acetone (state of the art). Toluene is suspected of being carcinogenic, and is therefore no longer used. In a concentrating operation, a solvent mixture means that there is no continuous boiling point, and so it is very difficult to remove the solvent down to a fraction of below 0.5% (percent by weight based on the polymer). Attempts are therefore made to polymerize acrylates in only one solvent and with one regulator. The regulator fulfils the functions of avoiding gelling, lowering the average molecular weight, absorbing the heat given off in the initiation phase, reducing the molecular weight distribution, and yet ensuring a high conversion.

The regulators used are generally thiols, alcohols or halides, such as carbon tetrabromide, for example [cf., for example, H.-G. Elias, "Makromoleküle", Hüthig & Wepf Verlag Basel 5th edition, 1990]. The use of halide regulators, as described in U.S. Pat. No. 7,034,085 B2, for example, is decreasing persistently on environmental grounds. Thiols and alcohols are suitable as regulators and, depending on concentration, greatly reduce the average molecular weight of the polymer. Often, however, they have the disadvantage of being volatile and are therefore located in the distillate following the removal of the solvent mixture. This results in the disadvantages that reusing the solvent mixture removed by distillation for further polymerizations leads to an accumulation of the compound with chain-transfer regulator activity, and hence that a reproducible molar mass distribution is not ensured as the recycling rate goes up.

US 20070299226 A1 describes various chain transfer regulators based on a thiol functionality. They do remain partly in the polymer, but have the disadvantage that they are partly toxic and, on account of their strong and unpleasant odour, are not suitable when the polymer is used for a product, such as a pressure-sensitive adhesive tape, for example, with which points of contact in everyday use are frequent. Moreover, the same specification describes polyfunctional thiols for use as regulators, but such thiols may even lead to crosslinking of the polymer and hence to high melt viscosities, thereby making it no longer possible to carry out processing from the melt. The mercapto-functionalized photoinitiators that are described in EP 1 311 554 B1 likewise result in crosslinking or make it necessary to ensure that the polymer prior to processing is not exposed to light or any other electromagnetic radiation, since otherwise there may be crosslinking.

It is an object of the invention to optimize the preparation of polyacrylates in respect of recovery of the solvent.

It should advantageously be possible to obtain polyacrylate compositions having sufficiently high average molecular weights that they can be used, for example, as pressure sensitive adhesives. The solvent mixture or solvent used in preparing the polyacrylates ought preferably to be able to be reused without purification steps following distillative removal; and the capacity for the polyacrylate to be processed in a hotmelt operation ought to be ensured.

SUMMARY OF THE INVENTION

It has been possible to achieve this object to outstanding effect through the use of amino acids as regulator substances in the free-radical polymerization of acrylic and/or methacrylic monomers in the preparation of polyacrylates, more particularly of monomer mixtures comprising at least 70% by weight of at least one acrylic and/or methacrylic ester.

The invention relates accordingly to a reaction solution, especially for free-radical polymerization, comprising one or more solvents and one or more monomers, at least 50% by weight of the solvents being organic solvents, and at least 70% by weight of the monomers being acrylic and/or methacrylic esters, the reaction solution additionally being admixed with at least one amino acid.

The amino acids used may be natural or non-natural amino acids.

DETAILED DESCRIPTION

It is possible to use a single organic solvent or a mixture of two or more organic solvents, possibly with water as well.

The weight fraction of organic solvents when water is present in the solvent mixture employed is at least 50% by weight, advantageously at least 90% by weight.

It is very advantageous for the reaction solution to be a homogeneous solution.

The amino acid or acids serve as polymerization regulators in the free-radical polymerization. Regulators, polymerization regulators or regulator substances are identified synonymously in the context of this specification as compounds having high transfer constants, which are used in free-radical polymerizations in order to limit the degree of polymerization of the macromolecules that form. They do not destroy the radical functionalities that are capable of propagation, but instead take over these functionalities from the ends of the growing macromolecules, in order then themselves to initiate the propagation of a new chain. In this way, for each radical produced in the system, two or more relatively short polymer chains are formed instead of one long one. Since the regulator substance does not destroy the radicals, there is also no change in the overall polymerization rate (see RÖMPP online 2009, document code RD-18-00666).

In one very preferred procedure, the at least one amino acid has at least one sulphanyl group (also referred to below as thiol groups or —SH group), at least one selanyl group (also referred to below as —SeH group) and/or a hydroxyl group (also referred to below as —OH group). In one advantageous embodiment of the invention, the aforementioned groups in the amino acid are terminal.

The reaction solution comprises at least one acrylic- or methacrylic-based monomer, a monomer mixture comprising at least 70% by weight of an acrylic or methacrylic ester, or, preferably, a monomer mixture comprising at least 70% by weight of acrylic and/or methacrylic esters.

In the text below, acrylic esters and methacrylic esters are also referred to collectively as acrylic monomers.

BRIEF DESCRIPTION OF THE DRWING

FIG. 1 illustrates an extruder, indicating two feeding points; one arranged early in the extruding process (1.1) and the other further downstream (1.2). The composition leaving the extruder is transferred between two rolls.

The acrylic monomers are selected at least partly, preferably completely, from the group of the monomers encompassing compounds of the general formula

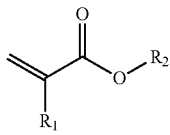

where
$R_1$=H or $CH_3$
and
$R_2$=H or an unbranched or branched, aliphatic, alicyclic or aromatic, unsubstituted or substituted hydrocarbon radical having 1 to 20 carbon atoms. The alcohol residue of acrylic acid monomers very preferably has no C=C double bonds.

In the presence of at least one free-radical initiator, the monomers can be polymerized via a free radical polymerization, with the at least one natural or non-natural amino acid containing at least one thiol and/or hydroxy group acting as polymerization regulator.

The invention further provides polyacrylates obtainable from a reaction solution as described above, particularly by free-radical polymerization of the monomers present therein.

Further encompassed by the invention is a process for preparing a polyacrylate from such a reaction solution by free-radical polymerization. For the free-radical polymerization it is possible to use one or more typical initiators, the initiators selected being more particularly those which do not enter into any unwanted secondary reactions with the amino acids. After the polymerisation the procedure is preferably such that the solvent is removed from the polymerization product. The residual solvent fraction is to be lowered to a fraction of not more than 5%, more particularly not more than 2%, especially not more than 0.5%, by weight, based on the mixture that remains following removal of the solvent (polymerization product, residual solvent, amino acids, possibly further constituents). It is preferred to aim for a solvent-free system. In particular the polymerization product is processed further from the melt (known as a "hotmelt").

In a preferred procedure, the solvent removed is supplied to a recycling operation. The solvent used for preparing the reaction solution may be taken wholly or partly from a recycling operation. With particular advantage the solvent is wholly or partly circulated—that is, following a polymerization, some or all of the solvent removed is used for preparing a reaction solution for a further polymerization.

In one preferred procedure the amino acid, or, where the reaction solution had two or more amino acids added to it, the amino acids, remain in the polymerization product when the solvent is removed. This may be accomplished more particularly through precipitation in the form of a solid. It is therefore particularly preferred for there to no longer be any amino acid radicals present (or, if any at all, in a negligible amount) in the solvent removed, particularly in the solvent supplied to the recycling operation.

All of the observations below refer, unless specifically described otherwise, to all aspects of the invention (reaction solution, preparation process, resultant polyacrylate and use of the amino acid as a regulator substance).

The monomer mixture is preferably selected such that plasticizing monomers in particular, and also monomers with functional groups that are capable of entering into reactions, especially addition reactions and/or substitution reactions, and also, optionally, further copolymerizable comonomers, more particularly hardening monomers are chosen. The nature of the polyacrylate to be prepared (more particularly PSA; however, also possible for use as heat-sealing compound, non-tacky viscoelastic material, and the like) may be influenced more particularly by varying the glass transition temperature of the polymer through different weight fractions of the individual monomers.

For purely crystalline systems there is a thermal equilibrium between crystal and liquid at the melting point $T_m$. Amorphous or partly crystalline systems, in contrast, are characterized by the conversion of the more or less hard amorphous or partly crystalline phase into a softer (rubber-like to viscous) phase. At the glass transition point, particularly in the case of polymeric systems, there is a "thawing" (or "freezing" on cooling) of the Brownian molecular motion of relatively long chain segments.

The transition from the melting point $T_m$ (also "melting temperature"; actually defined only for purely crystalline systems; "polymer crystals") to the glass transition point $T_g$ (also "glass transition temperature") can therefore be considered as a fluid transition, depending on the proportion of partial crystallinity in the sample under analysis.

In accordance with its measurements, the glass transition temperature can be reported as a dynamic temperature or as a static temperature. Figures for dynamic glass transition temperatures are based on the determination by means of dynamic mechanical analysis (DMA) at low frequencies (temperature sweep; measurement frequency: 10 rad/s; temperature range: −40° C. to max. 130° C.; heating rate: 2.5° C./min; Rheometric Scientific RDA III; parallel-plate arrangement, sample thickness 1 mm: sample diameter 25 mm: pre-tensioning with a load of 3N; sample stress for all measurements 2500 Pa), while those for the static glass transition temperature and for the melting points relate to determination by means of differential scanning calorimetry (DSC) in accordance with DIN 53765:1994-03.

In order to obtain polymers, such as PSAs or heat-sealing compounds, for example, having desired glass transition temperatures, the quantitative composition of the monomer mixture is advantageously selected such that the desired $T_g$ for the polymer results in accordance with an equation (E1) in analogy to the Fox equation (cf. T. G. Fox, Bull. Am. Phys. Soc. 1 (1956) 123).

$$\frac{1}{T_g} = \sum_n \frac{w_n}{T_{g,n}} \quad (E1)$$

In this equation, n represents the serial number of the monomers used, $w_n$ the mass fraction of the respective monomer n (% by weight) and $T_{g,n}$ the respective static glass transition temperature of the homopolymer of each of the monomers n, in K (kelvins).

For the application of the polyacrylate as a PSA, the fractions of the corresponding components are preferably selected such that the polymerization product exhibits more particularly a dynamic glass transition temperature ≤15° C. (DMA).

As softening and/or apolar monomers it is preferred to use acrylic and methacrylic esters with hydrocarbon radicals comprising 4 to 14 C atoms, preferably 4 to 9 C atoms. Examples of monomers of this kind are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate and 2-ethylhexyl methacrylate, for example.

As monomers with functional groups it is preferred to use those selected from the following listing of functionalities: carboxyl, sulphonic acid or phosphonic acid groups, phenols, thiols or amines.

Particularly preferred examples of monomers are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, diethylaminoethyl acrylate, diethylaminoethyl methacrylate, dimethylaminoethyl acrylate and dimethylaminoethyl methacrylate.

Additionally it is possible in principle for the purposes of the invention to use all compounds with vinylic functionality that are copolymerizable with the monomers identified above, and that may also be used to adjust the properties of the resultant PSA.

Monomers identified by way of example are as follows: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, t-butylphenyl acrylate, t-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-tri-methylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxy-methyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, Vinylidene halides, vinylpyridine, 4-vinylpyridine, N-vinylphthalimide, N-vinyllactam, N-vinylpyrrolidone, styrene, o- and p-methylstyrene, o-butylstyrene, 4-n-butylstyrene, 4-n-decylstyrene, 3,4-dimethoxystyrene. Macromonomers such as 2-polystyrene-ethyl methacrylate (molecular weight $M_w$ from 4000 to 13 000 g/mol), poly(methyl methacrylate)ethyl methacrylate ($M_w$ from 2000 to 8000 g/mol).

The monomers may advantageously also be selected such that they contain functional groups which support subsequent radiation crosslinking (by electron beams, UV, for example). Suitable copolymerizable photoinitiators are, for example, benzoin acrylate and acrylate-functionalized benzophenone derivatives; monomers which support crosslinking by electron beams are, for example, tetrahydrofurfuryl acrylate, N-tert-butylacrylamide, and allyl acrylate, this list not being conclusive.

Free-radical initiators that can be used for the free radical polymerization are all typical initiators known for such purpose in respect of acrylates. The production of C-centred radicals is described in Houben Weyl, *Methoden der Organischen Chemie*, Vol. E 19a, pp. 60-147. These methods can be employed in analogy. Examples of radical sources are peroxides, hydroperoxides and azo compounds; certain non-exclusive examples of typical free-radical initiators include potassium peroxodisulphate, dibenzoyl peroxide, cumene hydroperoxide, cyclohexanone peroxide, di-tert-butyl peroxide, azodiisobutyronitrile, cyclohexylsulphonyl acetyl peroxide, diisopropyl percarbonate, tert-butyl peroctoate and benzpinacol. In one very preferred variant the initiators are added in two or more stages, and so the conversion is raised to above 90%. The residual monomer content remaining in the polymer may in this way be lowered to below 10% by weight; a low residual monomer content considerably enhances the properties of the polyacrylate with respect to its further processing in a hotmelt operation.

The initiators used to initiate the polymerization are preferably selected such that they have a low tendency to form side chains in the polymers; their grafting activity is preferably below a value of $\epsilon<5$ at the temperature of the reaction mixture when the initiator is added.

The initiators may advantageously be added before or at the beginning of the polymerization to the monomer solution, and it is possible for the mixture to be topped up with initiators during the polymerization. The initiators are preferably used in the reaction solution in a fraction of 0.001% to 1% by weight, more preferably of 0.025% to 0.1% by weight, based on the monomer mixture.

The absolute grafting activity (crosslinking efficiency) is defined as the number of chemical side-chain formations per 100 mol units of decomposed initiator. In analogy to van Drumpt and Oosterwijk [*Journal of Polymer Science, Polymer Chemistry Edition* 1976, 14 1495-1511], a value for this number can be specified by determining the dimers in a defined solution of the initiator; see also DE 43 40 297 A1:

An exact 0.1 molar solution of the initiator in n-pentadecane is decomposed under an He atmosphere. The reaction time is selected such that it corresponds to ten times the half-life of the respective initiator at the temperature selected. This ensures virtually complete decomposition of the initiator. Next, the fraction of dimeric pentadecane formed is measured by means of GLC. The percentage fraction $\epsilon$ is reported as a measure of the grafting activity. The reaction temperature is typically selected such that the half-life of the test initiator at that temperature is 15 minutes.

High $\epsilon$ values for the grafting activity denote a high tendency on the part of the initiator to form side chains during the polymerization, whereas small $\epsilon$ values result in preferentially linear polymers.

In one preferred procedure for the process, the sequence of the process is as follows:
- the reaction solution used is an at least 50% strength solution of the monomers, with the initiator or initiators and the amino acid or amino acids containing at least one thiol, selanyl and/or hydroxy functionality added,
- the free-radical polymerization is carried out in a temperature range from 50° C. to 90° C.,
- during the polymerization, initiation is repeated at least one using an initiator for free-radical polymerizations that has a low tendency to form side chains (grafting activity $\epsilon<5$ at the prevailing reaction temperature),
- if desired, the reaction is controlled by dilution of the reaction solution, depending on the viscosity of the polymer,
- a controlled re-initiation takes place with up to 2% by weight, based on the monomer mixture, of an initiator with an increased tendency to form side chains (grafting activity $\epsilon>10$ at the prevailing reaction temperature),
- the polymerization is carried through to a conversion >90%, preferably >95%.

Preferred initiators having a low $\epsilon$ value ($\epsilon<5$) are those whose free radicals cause no or very infrequent abstraction of hydrogen on the polymer chains, on account of their low energy content. Preference here is given for example to the use of azo initiators such as azoisobutyrodinitrile or derivatives thereof, an example being 2,2-azobis(2-methylbutyronitrile) (Vazo® 67, DuPont).

Initiators having a high tendency to form side chains (high $\epsilon$ value>10) produce high grafting yields even at relatively low temperatures. Particular preference here is given to using bis(4-tert-butylcyclohexyl) peroxydicarbonate (Perkadox® 16, Akzo Chemie), dibenzoyl peroxide or the like.

The polymerization can be carried out in the presence of an organic solvent or in the presence of water, or in mixtures of organic solvents and/or water. Solvents used for the polymerization may be all solvents that are suitable or used typically for free-radical polymerizations, with acetone, ethyl acetate, benzine, toluene or any desired mixtures of these solvents being particularly appropriate.

The solvent or solvent mixture is present within the reaction solution in customary quantity ranges; advantageously it is present at 20% to 99% by weight, based on the reaction solution; very preferably, however, as little as solvent as possible is used. The polymerization time—depending on conversion, temperature and initiation—is between 6 and 48 h.

The polyacrylates prepared, especially adhesive polyacrylates, have an average molecular weight of between 250 000 and 1 000 000 g/mol, the average molecular weight being measured by SEC or GPC (for measurement see experimental section). The (co)polymers prepared generally possess the same or slightly narrower molecular weight distributions as the polymerizations carried out analogously with conventional regulators. The polydispersity may be lowered to a value of less than 6. As a result of the relatively narrow molecular weight distribution, there is a fall in the flow viscosity of the polyacrylate (especially of the PSA), and the polyacrylate is much simpler to process as a hotmelt (lower temperature needed for melting, higher throughput for the concentration procedure).

One particularly preferred variant of the inventive process uses polymerization regulators comprising natural or non-natural α-amino acids containing thiol, selanyl and/or hydroxyl groups, advantageously compounds of the following general structural formula

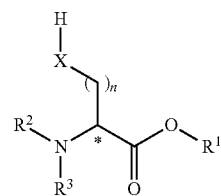

where $R^1$, $R^2$ and $R^3$ are selected independently of one another.

$R^1$ is preferably selected from the group (i), encompassing
(i) linear and branched $C_1$ to $C_{18}$ alkyl radicals, linear and branched $C_2$ to $C_{18}$ alkenyl radicals, linear and branched $C_2$ to $C_{18}$ alkynyl radicals, aryl radicals, cycloaliphatic, aliphatic and aromatic heterocycles, and hydrogen.

$R^2$ and $R^3$ are preferably selected from group (i) above or from group (ii), encompassing: (ii) acyl radicals, more particularly alkanoyl radicals, and cycloalkanecarbonyl radicals and arenecarbonyl radicals (—C(O)—R'), alkoxycarbonyl radicals (—C(O)—O—R'), carbamoyl radicals (—C(O)—NR'R"), and sulphonyl radicals (—SO$_2$R'), where R' and R" are radicals from group i) that are selected independently of one another;
X is selected more particularly to be oxygen (O), sulphur (S) or selenium (Se).

The letter n in the figure indicates the length of the hydrocarbon chain; n is a natural number including zero, and particularly $0 \leq n \leq 18$.

The α-amino acids have a stereogenic centre (labelled by the star * in the figure) and are therefore chiral. In a further advantageous embodiment of the invention, the chain-transfer regulators are used as the optically cure substance in the (D) or (L) configuration or are employed in the form of a racemic mixture.

As regulators it is additionally possible to use β-amino acids, aromatic amino acids and other non-natural amino acids familiar to the skilled person.

The process selected in this way makes it possible very effectively to prepare polyacrylates, especially PSAs, having the desired adhesive properties.

In another advantageous variant of the inventive process, the natural or non-natural amino acids containing thiol, sulphanyl and/or hydroxyl groups are used with a weight fraction of 0.001% to 5%, more particularly of 0.005% to 0.25%.

For the use of the polyacrylates prepared by the inventive process as PSAs, the polyacrylates are optimized optionally by blending with at least one resin. Tackifying resins for addition that can be used include, without exception, all tackifier resins that are already known and are described in the literature. Representatives that may be cited include the pinene and indene resins, rosins, their disproportionated, hydrogenated, polymerized and esterified derivatives and salts, the aliphatic and aromatic hydrocarbon resins, terpene resins and terpene-phenol resins, and also C5, C9 and other hydrocarbon resins. Any desired combinations of these and further resins may be used in order to adjust the properties of the resultant adhesive in accordance with requirements. Generally speaking, it is possible to use all resins which are compatible (soluble) with the corresponding polyacrylate, reference being made more particularly to all aliphatic, aromatic and alkylaromatic hydrocarbon resins, hydrocarbon resins based on pure monomers, hydrogenated hydrocarbon resins, functional hydrocarbon resins and natural resins. Reference may be made expressly to the depiction of the state of knowledge in the "Handbook of Pressure Sensitive Adhesive Technology", by Donatas Satas (van Nostrand, 1989).

In another advantageous development, one or more plasticizers are metered into the PSA, examples being low molecular mass polyacrylates, phthalates, whale oil plasticizers (water-soluble plasticizers) or plasticizing resins. In one preferred development, phosphates/polyphosphates are used for acrylate hotmelts.

The acrylate hotmelts may additionally be blended with one or more additives such as ageing inhibitors, light stabilizers, ozone protectants, fatty acids, resins, nucleating agents, expandants, compounding agents and/or accelerants.

They may also be admixed with one or more fillers such as fibres, carbon black, zinc oxide, titanium dioxide, solid or hollow glass (micro)spheres, microspheres made of other materials, silica, silicates and chalk.

For use as a PSA in particular it is advantageous for the inventive process if the polyacrylate is applied as a layer preferably from solution to a support or to a carrier material.

One advantageous onward development of the inventive process is when the polyacrylates prepared as described above are concentrated to give a polyacrylate composition whose solvent content is ≤5% by weight, more particularly ≤2% by weight. This operation takes place preferably in a concentrating extruder. In that case, in an advantageous variant of the process, the polyacrylate composition is applied as a hotmelt composition, in the form of a layer, to a support or to a carrier material.

The invention therefore further provides adhesive tapes coated on one or both sides with adhesive.

In one particularly advantageous variant of the two processes set out above, the solvent or solvent mixture is used again in the polymerization, and the polymers thus prepared, even after a very high recycling rate of the solvent or solvent mixture, exhibit no change in molar masses or in molar mass distribution.

For the two variants of the inventive process that have just been set out, it is preferred as carrier materials, for adhesive tapes, for example, to use the materials that are customary and familiar to the skilled person, such as films (polyester, PET, PE, PP, BOPP, PVC), nonwovens, foams, woven fabrics and woven sheets, and also release paper (glassine, HDPE, LDPE). This list is not conclusive.

For PSA use it is particularly advantageous to crosslink the polyacrylates following coating onto the support or onto the carrier material. For the production of the pressure-sensitive adhesive tapes, the polymers described above are for this purpose blended optionally with crosslinkers. Crosslinking may advantageously be induced thermally or by means of high-energy radiation, in the latter case more particularly by electron beams or, following addition of suitable photoinitiators, by ultraviolet radiation.

Preferred radiation-crosslinking substances according to the inventive process include, for example, difunctional or polyfunctional acrylates or difunctional or polyfunctional urethane acrylates, difunctional or polyfunctional isocyanates or difunctional or polyfunctional epoxides. Very advantageously it is likewise possible to use metal chelate compounds. However, use may also be made here of any other difunctional or polyfunctional compounds that are familiar to the skilled person and are capable of crosslinking polyacrylates.

Suitable photoinitiators include preferably Norrish type I and type II cleavers, with some possible examples of both classes being benzophenone derivatives, acetophenone derivatives, benzyl derivatives, benzoin derivatives, hydroxyalkylphenone derivatives, phenyl cyclohexyl ketone derivatives, anthraquinone derivatives, thioxanthone derivatives, triazine derivatives or fluorenone derivatives, this list making no claim to completeness.

Also claimed is the use of the polyacrylate prepared by the inventive process as a pressure sensitive adhesive.

Particularly advantageous is the use of the polyacrylate PSA, prepared as described, for an adhesive tape, in which case the polyacrylate PSA may be applied to one or both sides of a carrier.

EXAMPLES

Test Methods

The following test methods were employed to evaluate the adhesive properties and general properties of the PSAs prepared.

180° Bond Strength Test (test A)

A 20 mm wide strip of an acrylate PSA applied as a layer to polyester was applied to steel plates. The PSA strip was pressed onto the substrate twice using a 2 kg weight. The adhesive tape was then immediately pulled from the substrate at 300 mm/min and at an angle of 180°. The steel plates were washed twice with acetone and once with isopropanol. The results are reported in N/cm and are averaged from three measurements. All measurements were conducted at room temperature.

Shear Strength (Test B)

A 13 mm wide strip of the adhesive tape was applied to a smooth steel surface which had been cleaned three times with acetone and once with isopropanol. The application area was 20 mm·13 mm (length·width). The adhesive tape was then pressed onto the steel support four times under an applied pressure of 2 kg. At 80° C. a 1 kg weight was affixed to the adhesive tape, at room temperature a 1 kg or 2 kg weight. The holding powers measured are reported in minutes and correspond to the average from three measurements.

Residual Monomer Content (Test C)

The residual monomer content was determined analytically by liquid extraction of the PSAs used, followed by capillary gas chromatography.

Rheology (Test D)

The measurements were carried out using the Dynamic Stress Rheometer instrument from Rheometrics. The frequency range from 0.1 to 100 rad/s was scanned at 25° C. The temperature sweep was measured 10 rad/s in a temperature range from −25° C. to 130° C. All experiments were conducted with the parallel plate arrangement.

Gel Permeation Chromatography GPC (Test E)

The average molecular weight $M_w$ and the polydispersity PD were determined by the following techniques: the eluent used was THF containing 0.1% by volume trifluoroacetic acid. Measurement was carried out at 25° C. The preliminary column used was PSS-SDV, μm, $10^3$ Å ($10^2$ nm), ID 8.0 mm·50 mm. Separation was effected using the columns PSS-SDV, 5 μm, $10^3$ and also $10^5$ and $10^6$, each with ID 8.0 mm×300 mm. The sample concentration was 4 g/l, the flow rate 1.0 ml per minute. Measurement was made against PMMA standards.

K Value (According to FIKENTSCHER) (Test F):

The K value is a measure of the average size of molecules of high polymers. It is measured by preparing one percent strength (1 g/100 ml) toluenic polymer solutions and determining their kinematic viscosities with the aid of a VOGEL-OSSAG viscometer. Following standardization to the viscosity of toluene, the relative viscosity is obtained, and the K value can be calculated from this figure by the method of FIKENTSCHER (*Polymer* 1967, 8, 381 ff.)

Preparation of the Examples

Example 1a-c

A 2 l glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, 150 g of acetone and
a) 0.2 g of N-acetyl-(L)-cysteine
b) 0.4 g of N-acetyl-(L)-cysteine
c) 4.0 g of N-acetyl-(L)-cysteine.

After nitrogen gas had been passed through the reactor for 45 minutes, with stirring, the reactor was heated to 58° C., and then 0.2 g of azoisobutyronitrile (AIBN) was added. After a reaction time of an hour, 0.2 g of Vazo® 52 (DuPont), after 1.30 h 0.4 g of Vazo® 52, and after 2 h 0.6 g Vazo® 52 were added. After 4 h, dilution was carried out with 150 g of acetone. After 24 h and again after 36 h, Perkadox® 16 (Akzo) was added, at 0.4 g each time. After a reaction time of 48 h, the polymerization was discontinued and the reaction mixture was cooled to room temperature. The polymer was analysed using test methods C, E and F.

Example 2

Reference

A 2 l glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate and 150 g of acetone/isopropanol (97:3). After nitrogen gas had been passed through the reactor for 45 minutes, with stirring, the reactor was heated to 58° C., and then 0.2 g of azoisobutyronitrile (AIBN) was added. After a reaction time of an hour, 0.2 g of Vazo® 52 (DuPont), after 1.30 h 0.4 g of Vazo® 52, and after 2 h 0.6 g Vazo® 52 were added. After 4 h, dilution was carried out with 150 g of acetone/isopropanol (97:3). After 6 h and again after 8 h, Perkadox® 16 (Akzo) was added, at 0.4 g each time. After a reaction time of 12 h, the polymerization was discontinued and the reaction mixture was cooled to room temperature. The polymer was analysed using test methods C, E and F.

Example 3

Reference

A 2 l glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate and 150 g of acetone. After nitrogen gas had been passed through the reactor for 45 minutes, with stirring, the reactor was heated to 58° C., and then 0.2 g of azoisobutyronitrile (AIBN) was added. After a reaction time of an hour, 0.2 g of Vazo® 52 (DuPont), after 1.30 h 0.4 g of Vazo® 52, and after 2 h 0.6 g Vazo® 52 were added. After 4 h, the batch underwent gelling and the polymerization was discontinued.

Example 4a-c

A 2 l glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, 150 g of acetone and
a) 0.2 g of dodecanethiol
b) 0.4 g of dodecanethiol
c) 4.0 g of dodecanethiol.

After nitrogen gas had been passed through the reactor for 45 minutes, with stirring, the reactor was heated to 58° C., and then 0.2 g of azoisobutyronitrile (AIBN) was added. After a reaction time of an hour, 0.2 g of Vazo® 52 (DuPont), after 1.30 h 0.4 g of Vazo® 52, and after 2 h 0.6 g Vazo® 52 were added. After 4 h, dilution was carried out with 150 g of acetone. After 24 h and again after 36 h, Perkadox® 16 (Akzo) was added, at 0.4 g each time. After a reaction time of 48 h, the polymerization was discontinued and the reaction mixture was cooled to room temperature. The polymer was analysed using test methods C, E and F.

Example 5a-c

A 2 l glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, 150 g of acetone and a) 0.2 g of Thiocure® PETMP
b) 0.4 g of Thiocure® PETMP
c) 4.0 g of Thiocure® PETMP.

(Thiocure® PETMP: pentaerythritol tetra(3-mercaptopropionate), from Bruno Buch Thio chemicals). After nitrogen gas had been passed through the reactor for 45 minutes, with stirring, the reactor was heated to 58° C., and then 0.2 g of azoisobutyronitrile (AIBN) was added. After a reaction time of an hour, 0.2 g of Vazo® 52 (DuPont), after 1.30 h 0.4 g of Vazo® 52, and after 2 h 0.6 g Vazo® 52 were added. After 4 h, dilution was carried out with 150 g of acetone. After 24 h and again after 36 h, Perkadox® 16 (Akzo) was added, at 0.4 g each time. After a reaction time of 48 h, the polymerization was discontinued and the reaction mixture was cooled to room temperature. The polymer was analysed using test methods C, E and F.

Results

In order to allow the activities of the regulator to be compared, the chain-transfer constant was determined with the aid of the Mayo equation (E2)

$$\frac{1}{P_n} = \frac{1}{P_{n,0}} + C_{tr} \cdot \frac{[\text{regulator}]}{[\text{monomer}]} \quad (E2)$$

where $P_n$ is the degree of polymerization, $P_{n,0}$ is the degree of polymerization of the unregulated reaction, [regulator] is the concentration of the chain-transfer regulator, [monomer] is the monomer concentration, and $C_{tr}$ is the chain-transfer constant.

The results of the polymerizations are listed in Table 1.

TABLE 1

| Example | $M_w$ | PD | K value | $C_{tr}$ | Conversion |
|---|---|---|---|---|---|
| 1a | 115 000 | 5.35 | 62.3 | 0.90 | 99.1% |
| 1b | 120 000 | 4.36 | 53.1 | | 99.2% |
| 1c | 25 700 | 2.12 | 22.0 | | 99.1% |
| 2 | 486 000 | 7.60 | 72.2 | $1.5 \cdot 10^{-3}$ | 99.4% |
| 3 | — | — | — | — | — |
| 4a | 88 200 | 8.68 | 64.6 | 0.49 | 99.2% |
| 4b | 133 000 | 4.76 | 57.1 | | 99.4% |
| 4c | 31 300 | 2.69 | 26.8 | | 98.9% |
| 5a | 103 000 | 20.26 | 89.9 | 0.78 | 99.3% |
| 5b | 171 000 | 6.57 | 67.1 | | 99.0% |
| 5c | 49 400 | 2.12 | 30.2 | | 98.2% |

$M_w$: average molecular weight (weight average) [g/mol]
PD: polydispersity,
$C_{tr}$: chain-transfer constant Table 1 shows that a polymerization in pure solvent (Example 3) is attended by problems. Achieving a high conversion requires a relatively large quantity of initiator, in which case the batch has undergone gelling after a reaction time of just 4 h, and it is necessary to discontinue the polymerization. The polymerizations of Examples 1, 2, 4 and 5 show that regulators prevent the gelling whilst still enabling high conversions of >98% to be achieved, through initiation in two or more stages and with two or more initiators. Yet alcohols, such as isopropanol, are of only limited suitability, since the latter regulator cannot be incorporated into the PSA and hence remains in the solvent. For concentration to the hot-melt, it is necessary to carry out distillative removal of a solvent mixture at low pressure. The throughput in that case is greatly reduced as result of a change in boiling point.

Thiols (Examples 1, 4 and 5), in contrast, are incorporated into the polymer during the polymerization process and do not adversely affect the concentration process. In addition to these criteria, the achievable average molecular weight and the molecular weight distribution (dispersity) are critically important for the technical adhesive properties. Examples 1a-c show that amino acids containing thiol groups, such as N-acetyl-(L)-cysteine, are the most efficient regulators and therefore achieve the lowest polydispersity for the polyacrylate PSA in question. Moreover, in contrast to dodecanethiol, such amino acids are not toxic, thereby removing any controversy from operation with such compounds and from the residual presence of trace amounts in the polyacrylate material. The tetrafunctional thiol PETMP causes high crosslinking of the polymer, which would likewise give rise to disadvantages in the concentration process.

Preparation of the Starting Polymers for PSA Examples B1 to B4

Described below is the preparation of the starting polymers. The polymers investigated are prepared conventionally via a free radical polymerization in solution. For the first polymerization of the respective base polymers P1 to P4, fresh solvent is used; all further polymerizations are carried out with the solvent or solvent mixture recovered by method 1.

Base Polymer P1

Comparative Example

A reactor conventional for free-radical polymerizations was charged with 27 kg of 2-ethylhexyl acrylate, 67 kg of n-butyl acrylate, 3 kg of methyl acrylate, 3 kg of acrylic acid and 66 kg of acetone/isopropanol (95:5). After nitrogen gas had been passed through the reactor for 45 minutes, with stirring, the reactor was heated to 58° C. and 50 g of AIBN were added. Thereafter the external heating bath was heated to 75° C. and the reaction was carried out constantly at this external temperature. After 1 h a further 50 g of AIBN were added, and after 4 h dilution took place with 20 kg of acetone/isopropanol mixture. After 5 h 30 min and again after 7 h, bis(4-tert-butylcyclohexyl) peroxydicarbonate was added for re-initiation—150 g each time. After a reaction time of 22 h, the polymerization was discontinued and the reaction mixture was cooled to room temperature. The polyacrylate has a conversion of 99.6%, a K value of 76.0, a solids content of 54%, an average molecular weight of Mw=760 000 g/mol, polydispersity PD (Mw/Mn)=9.6.

Base Polymer P2 (N-acetyl-(L)-cysteine)

A reactor conventional for free-radical polymerizations was charged with 27 kg of 2-ethylhexyl acrylate, 67 kg of n-butyl acrylate, 3 kg of methyl acrylate, 3 kg of acrylic acid, 50 g of N-acetyl-(L)-cysteine and 66 kg of acetone. After nitrogen gas had been passed through the reactor for 45 minutes, with stirring, the reactor was heated to 58° C. and 50 g of AIBN were added. Thereafter the external heating bath was heated to 75° C. and the reaction was carried out constantly at this external temperature. After 1 h a further 50 g of AIBN were added, and after 4 h dilution took place with 20 kg of acetone. After 5 h 30 min and again after 7 h, bis(4-tert-butylcyclohexyl) peroxydicarbonate was added for re-initiation—150 g each time. After a reaction time of 22 h, the polymerization was discontinued and the reaction mixture was cooled to room temperature. The polyacrylate has a conversion of 99.7%, a K value of 75.8, a solids content of 54%, an average molecular weight of Mw=755 000 g/mol, polydispersity PD (Mw/Mn)=4.7.

Base polymer P3 (rac-N-acetylcysteine methyl ester)

A reactor conventional for free-radical polymerizations was charged with 27 kg of 2-ethylhexyl acrylate, 67 kg of n-butyl acrylate, 3 kg of methyl acrylate, 3 kg of acrylic acid, 55 g of rac-N-acetylcysteine methyl ester and 66 kg of acetone. After nitrogen gas had been passed through the reactor for 45 minutes, with stirring, the reactor was heated to 58° C. and 50 g of AIBN were added. Thereafter the external heating bath was heated to 75° C. and the reaction was carried out constantly at this external temperature. After 1 h a further 50 g of AIBN were added, and after 4 h dilution took place with 20 kg of acetone. After 5 h 30 min and again after 7 h, bis(4-tert-butylcyclohexyl) peroxydicarbonate was added for re-initiation—150 g each time. After a reaction time of 22 h, the polymerization was discontinued and the reaction mixture was cooled to room temperature. The polyacrylate has a conversion of 99.5%, a K value of 75.7, a solids content of 54%, an average molecular weight of Mw=751 000 g/mol, polydispersity PD (Mw/Mn)=5.1.

Base polymer P4 (dodecanethiol)

A reactor conventional for free-radical polymerizations was charged with 27 kg of 2-ethylhexyl acrylate, 67 kg of n-butyl acrylate, 3 kg of methyl acrylate, 3 kg of acrylic acid, 62 g of dodecanethiol and 66 kg of acetone. After nitrogen gas had been passed through the reactor for 45 minutes, with stirring, the reactor was heated to 58° C. and 50 g of AIBN were added. Thereafter the external heating bath was heated to 75° C. and the reaction was carried out constantly at this external temperature. After 1 h a further 50 g of AIBN were added, and after 4 h dilution took place with 20 kg of acetone.

After 5 h 30 min and again after 7 h, bis(4-tert-butylcyclohexyl) peroxydicarbonate was added for re-initiation—150 g each time. After a reaction time of 22 h, the polymerization was discontinued and the reaction mixture was cooled to room temperature. The polyacrylate has a conversion of 99.6%, a K value of 76.3, a solids content of 54%, an average molecular weight of Mw=768 000 g/mol, polydispersity PD (Mw/Mn)=5.2.

Method 1: Concentration/Preparation of the Hotmelt PSAs:

The acrylate copolymers (base polymers P1 to P4) are very largely freed from the solvent (residual solvent content≤0.3% by weight; cf. the individual examples) by means of a single-screw extruder (concentrating extruder, BERSTORFF GmbH, Germany). The solvent is condensed and used again without further purification for the polymerization of P1 to P4, with a check being made by determination of the K value, using test method F, after each polymerization, in order to ensure that PSAs having the same properties are prepared. The screw speed was 150 rpm, the motor current 15 A, and a throughput of 58.0 kg liquid/h was realized. For concentration, a vacuum was applied at three different domes. The reduced pressures were, respectively, between 20 mbar and 300 mbar. The exit temperature of the concentrated hotmelt is approximately 115° C. The solids content after this concentration step was 99.8%.

Method 2: Preparation of the Modified Hotmelt PSAs:

The acrylate hotmelt PSA prepared by method 1 as elucidated above was conveyed directly into a downstream WELDING twin-screw extruder (WELDING Engineers, Orlando, USA; Model 30 mM DWD; screw diameter 30 mm, screw 1 length=1258 mm; screw 2 length=1081 mm; 3 zones). Via a solids metering system, the resin Dertophene® T110 (DRT RESINS, France) was metered in zone 1 and mixed in homogeneously. The rotary speed was 451 rpm, the motor current 42 A, and a throughput of 30.1 kg/h was realized. The temperatures in zones 1 and 2 were each 105° C., the melt temperature in zone 1 was 117° C., and the composition temperature on exit (zone 3) was 100° C.

Method 3: Production of the Inventive Adhesive Tapes, Blending with the Crosslinker System for Thermal Crosslinking, and Coating:

The acrylate hotmelt PSA prepared by methods 1-2 were melted in a feeder extruder (single-screw conveying extruder from TROESTER GmbH & Co KG, Germany) and using this extruder were conveyed as a polymer melt into a twin-screw extruder 1.3 (cf. FIG. 1) (LEISTRITZ, Germany, ref. LSM 30/34). The assembly is heated electrically from the outside and is air-cooled via a number of fans, and is designed such that, with the effective distribution of the crosslinker Polypox R16 (pentaerythritol polyglycidyl ether, CAS No.: 3126-63-4, tetrafunctional epoxide from UPPC AG, Germany) and of the accelerant Polypox H205 (polyoxypropylenediamine, CAS No.: 9046-10-0, amine hardener from UPPC AG, Germany) in the polymer matrix, there is at the same time a short residence time ensured for the adhesive in the extruder. For this purpose, the mixing shafts of the twin-screw extruder were arranged in such a way that conveying elements are in alternation with mixing elements. The addition of the respective crosslinkers and accelerants is made with suitable metering equipment, where appropriate at two or more locations (cf. FIG. 1: metering locations 1.1 and 1.2) and, where appropriate, with the use of metering assistants into the unpressurized conveying zones of the twin-screw extruder.

Following exit of the ready-compounded adhesive, i.e. of the adhesive blended with the crosslinker and accelerant, from the twin-screw extruder (exit: circular die, 5 mm diameter), coating takes place in accordance with FIG. 1 onto a carrier material in web form onto the coating roll (BW). The time between metered addition of the crosslinker-accelerant system and the shaping or coating procedure is termed the processing life. This processing life indicates the period within which the adhesive, blended with the crosslinker or crosslinker-accelerant system, can be coated with the visually good appearance (gel-free, speck-free). Coating takes place with web speeds between 1 m/min and 20 m/min; the doctor roll (RW) of the 2-roll applicator is not driven.

Examples B1-B4

The base polymers P1-P4 are polymerized in accordance with the polymerization process described, and are concentrated using method 1 (solids content 99.8%), and a sample of the non-crosslinked polymer is analysed for its K value, in order to show that there are no residues in the solvent recyclate that have a molar mass regulator function. Subsequently, using method 2, the compositions were blended with Dertophene® T110 resin, and these resin-modified acrylate hotmelts were then compounded continuously by method 3 with the crosslinker-accelerant system.

Detailed description given by way of example: in the twin-screw extruder described in method 3, a total mass flow consisting of 70 parts of polymer P1 and 30 parts of Dertophene® T110 resin of 533.3 g/min (corresponding to 373 grams of pure polymer per minute) was blended with 0.45% by weight (based on polymer solids) of the epoxide crosslinker Polypox R16 and with 0.72% by weight (based on polymer solids) of the accelerant Polypox H205. The accelerant was metered via a peristaltic pump at metering location 1.1 (see FIG. 1), while the crosslinker was metered in likewise via a peristaltic pump at metering location 1.2.

The processing life of the completed compound formulation was more than 10 minutes at an average adhesive temperature of 125° C. after leaving the LEISTRITZ twin-screw extruder. Coating takes place on a 2-roll applicator as per FIG. 1, with roll surface temperatures of 100° C. in each case and at a coat weight of 110 g/m² onto 23 μm PET film.

Results

Examples B1 to B4 were carried out a total of ten times, the polymerization being carried out in each case using the solvent recovered by distillation, by method 1, in order to demonstrate that there are no residues of the regulator in the solvent anymore. After each concentration of the polymer, the K values were determined by test method F (K1 to K10 for each respective polymerization mixture). For technical adhesive testing of Examples 1 to 4, test methods A and B were carried out.

The results of the polymerizations are listed in Table 2.

TABLE 2

| Example | K1 | K2 | K3 | K4 | K5 | K6 | K7 | K8 | K9 | K10 |
|---|---|---|---|---|---|---|---|---|---|---|
| B1 | 76.0 | 76.1 | 76.3 | 76.5 | 76.8 | 77.0 | 77.4 | 77.7 | 78.0 | 78.4 |
| B2 | 75.8 | 75.8 | 75.9 | 75.8 | 75.8 | 75.9 | 75.7 | 75.8 | 75.7 | 75.8 |
| B3 | 75.7 | 75.8 | 75.7 | 75.7 | 75.7 | 75.8 | 75.9 | 75.7 | 75.7 | 75.7 |
| B4 | 76.3 | 76.3 | 76.2 | 76.1 | 76.1 | 75.9 | 75.9 | 75.8 | 75.9 | 75.7 |

Table 2 demonstrates that reusing the solvent distillate consisting of acetone and isopropanol (Example 1) is attended by problems. The isopropanol acts as a chain-transfer regulator, but because of its lower vapour pressure as compared with acetone it is depleted with each distillation cycle, hence leading, in the polymerization carried out with the solvent recyclate, following distillation, to increases in the molar masses and hence in the K value. This would mean that following each distillation it will be necessary to check the proportion of isopropanol to acetone and, where necessary, re-adjust it once more, in order to continue to obtain polymers with the same molar mass distribution.

The polymerizations of Examples 2 and 3 demonstrate that amino acids which are solids are suitable regulators and that even after multiple re-use of the solvent recyclate there is no change in K value, within the bounds of measurement accuracy.

Similar results were also found with dodecanethiol as the regulator, although with a tendency in evidence for the K values to drop over time, indicating a reduction in the molar mass. In spite of the low vapour pressure it is likely that a certain fraction of dodecanethiol, which is a liquid, is entrained together with the solvent and hence gradually accumulates in the recyclate.

The regulator concept of the invention for improving the recycling of solvent for the polymerization has therefore been proven.

Table 3 shows the bond strengths to steel and also the holding powers for the first mixture in each case.

TABLE 3

| Example | HP RT 10 N | BS steel [N/cm] |
|---|---|---|
| 1.1 | 4150 | 6.6 |
| 2.1 | 3180 | 6.8 |

TABLE 3-continued

| Example | HP RT 10 N | BS steel [N/cm] |
|---|---|---|
| 3.1 | 3100 | 6.8 |
| 4.1 | 3150 | 6.9 |

Coat weight: 110 g/m².
HP: Holding powers [min]
BS: Bond strength to steel

The composition regulated using isopropanol gave the highest shear strength as compared with the other polymerization regulators, which, however, are not substantially poorer. In general it was possible to show that similar technical adhesive properties were achievable with all the regulators.

The advantage of the regulators of the invention will be underscored below by means of further examples.

The further technical adhesive tests of Examples 1.10-4.10 were carried out again by test methods A and B, using the samples whose polymers had been polymerized with the solvent re-used ten times. In addition, the flow viscosity was measured, using test method D. The results of the polymerizations are listed in Table 4.

TABLE 4

| Example | HP (RT, 10 N) | BS steel [N/cm] | η[Pa * s] at 130° C. and 1 rad/s |
|---|---|---|---|
| 1.10 | 4620 | 5.9 | 5800 |
| 2.10 | 3200 | 6.9 | 4800 |
| 3.10 | 3150 | 6.8 | 4800 |
| 4.10 | 3010 | 6.9 | 4600 |

Coat weight: 110 g/m².
HP: Holding powers [min]
BS: Bond strength to steel
η: Flow viscosity by test D This example shows very clearly the advantage of the inventive regulator system. As a result of the change in molar mass in Example 1.10, there is a very significant change in the technical adhesive properties as compared with those of Example 1.1. The other regulators produced samples with reproducible technical adhesive data; in Example 4.10 there is a slight fall in the shear strength, owing to the reduction in molar mass, and the viscosity as well is lower as compared to the compositions regulated with amino acids.

The invention claimed is:

1. Process for preparing a polyacrylate pressure-sensitive adhesive from a reaction solution consisting of a solvent selected from the group consisting of a single organic solvent or a mixture of two or more organic solvents, one or more monomers, at least 70% by weight of the monomers being acrylic and/or methacrylic esters, free radical initiator and one or more natural or non-natural α-amino acids of the following structural formula

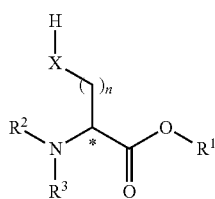

where $R^1$, $R^2$ and $R^3$ are selected independently of one another, with $R^1$ selected from the group (i), consisting of (i) linear and branched $C_1$ to $C_{18}$ alkyl radicals, linear and branched $C_2$ to $C_{18}$ alkenyl radicals, linear and branched $C_2$ to $C_{18}$ alkynyl radicals, arylradicals, cycloaliphatic, aliphatic and aromatic heterocycles, and hydrogen, and where one of $R^2$ or $R^3$ is hydrogen, and the other is selected from the group consisting of group (ii), (ii) acyl radicals (—C(O)—R'), alkoxycarbonyl radicals (—C(O)—O—R'), carbamoyl radicals (—C(O)—NR'R"), and sulphonyl radicals (—SO$_2$R'), where R' and R" are radicals from group i) that are selected independently of one another, and X is oxygen (O), sulphur (S) or selenium (Se), and n is a natural number including zero by free-radical polymerization, wherein the solvent is removed from the polymerization product after the polymerization, down to a residual solvent fraction of not more than 2% and wherein the amino acid or acids remain in the polymerization product when the solvent is removed.

2. Process according to claim 1 wherein the solvent removed is supplied to a recycling operation.

3. Process according to claim 1, wherein at least one of the organic solvents used is taken from a recycling operation.

4. Process for the free-radical polymerization of monomer mixtures comprising at least 70% by weight of at least one acrylic and/or methacrylic ester, wherein amino acids are present as regulator substances.

5. Process according to claim 1, wherein the reaction solution is a homogeneous solution.

6. Process according to claim 1, wherein said at least one amino acid has at least one sulphanyl, selanyl and/or hydroxyl group.

7. Process according to claim 6, wherein said at least one sulphanyl, selanyl and/or hydroxyl group is terminal.

8. Process according to claim 1, wherein n is in the range $0 \leq n \leq 18$.

9. Process according to claim 1, wherein the acrylic and/or methacrylic ester or esters satisfy the formula

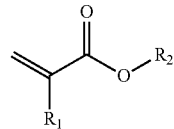

where
$R_1$=H or $CH_3$
and
$R_2$=H or an unbranched or branched, aliphatic, alicyclic or aromatic, unsubstituted or substituted hydrocarbon radical having 1 to 20 carbon atoms without C=C double bonds.

* * * * *